June 28, 1938. J. W. HUME 2,122,064

WHEEL BALANCER

Filed Aug. 1, 1934

Inventor
James W. Hume
By Beaman & Langford
Attorney

Patented June 28, 1938

2,122,064

UNITED STATES PATENT OFFICE 2,122,064

WHEEL BALANCER

James W. Hume, Jackson, Mich.

Application August 1, 1934, Serial No. 737,902

2 Claims. (Cl. 301—5)

The present invention relates to balance weights for attachment on the tire retaining flange of a vehicle wheel to balance the unbalanced force which would otherwise result in objectionable vibration of the wheel on rotation.

This invention comprises an embodiment of the balancing weight disclosed in my co-pending application Serial No. 645,504 filed December 3, 1932 and is particularly adapted to be used on wheel rims of the type generally used for oversized low pressure tires although of course it may be applied to any rim.

An object of this invention is to provide, for attachment to the tire rim flange, a two piece balancing unit comprising a weighted body and an attachment portion, the attachment portion being either resilient or non-resilient.

It is another object of this invention to provide a two piece balancing unit which may be assembled upon the rim flange.

A further object is to provide a balancing unit having means for positively clamping a weighted body against the tire retaining flange.

Figure 1:
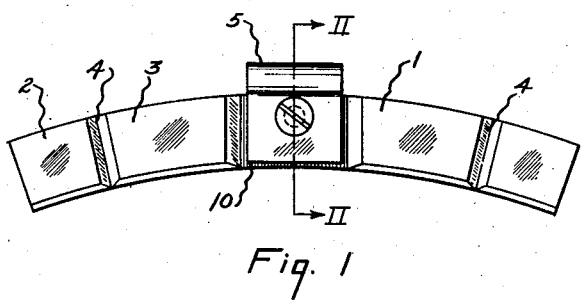
Figure 2:
Figure 3:
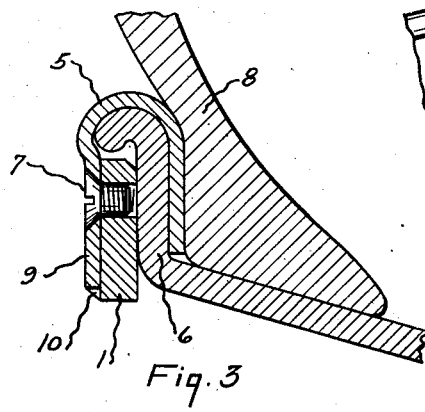
Figure 4:
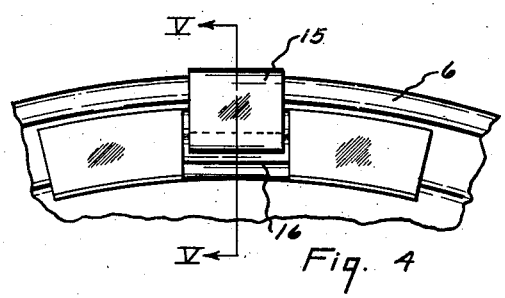
Figure 5:
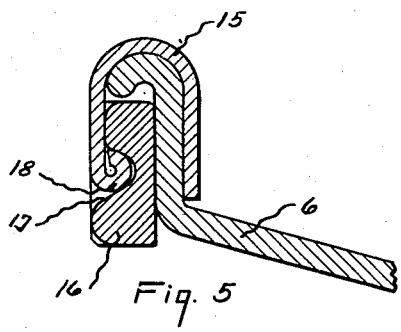
Figure 6:
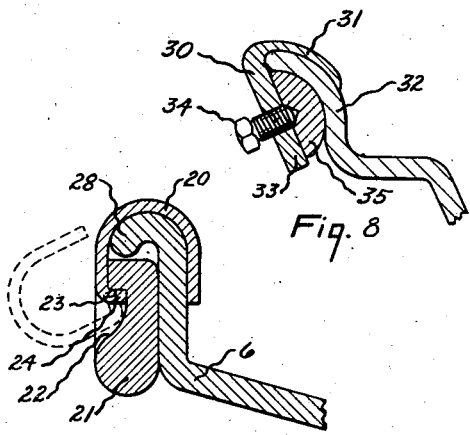
Figure 7:
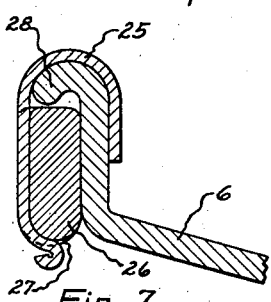

These and other objects will be apparent from the following specification when taken with the accompanying drawing in which:

Fig. 1 is a side elevation of a balancing weight and its separable attaching clamp, Fig. 2 is a section taken on the line II—II of Fig. 1, Fig. 3 is a vertical section taken through the construction of Fig. 1 showing the weight secured to the tire retaining flange of a vehicle wheel together with a portion of the tire in position, Fig. 4 is a side elevation of another form of balance weight and attaching clamp, and a portion of the wheel rim to which it is attached, Fig. 5 is a section taken on the line V—V of Fig. 4, Fig. 6 is a vertical section of another form of balance weight and attaching clamp, and a portion of the wheel rim to which it is attached, Fig. 7 is a vertical section of still another form of balance weight and attaching clamp, and a portion of the wheel rim to which it is attached, and Fig. 8 is a vertical section of still another form of balance weight and attaching clamp, and a portion of the wheel rim to which it is attached.

The primary feature of this invention is the provision of a wheel balancing unit having two parts, namely, a weighted body portion and an attaching portion. The weighted body portion is thickened to provide the necessary weight and fits under the tire retaining flange of the wheel rim adjacent the outer edge thereof. The attaching portion is in general relatively thin, one part substantially following the contour of the upper side of the tire retaining flange where it may or may not be clamped against the flange by the tire depending on its length. The other part of the attaching portion is reversely bent so that the whole straddles the flange and the weight.

The attaching portion may be resilient or substantially non-resilient. For instance as shown in the drawing the attaching portion of Figs. 2, 6 and 8 may be either resilient or non-resilient and those of Figs. 5 and 7 may be resilient only.

In the designs embodying a resilient attachment portion the normal untensioned contour of the attachment portion is such that in operative position it is slightly sprung outwardly so that it will maintain a frictional grip against the tire retaining flange. When the attachment portion is of such length that it normally reposes between the flange and the tire wall the pressure exerted on it by the tire acts in addition to the inherent resiliency to maintain it against the flange.

In those embodiments wherein the attaching portion fits under the tire wall to be clamped against the flange the attaching portion is of relatively thin configuration to prevent undesirable interference with the tire. Where the design of the rim is such that the tire does not reach the outer edge of the flange, the attaching portion may extend over the upper side of the flange such a short distance that it does not contact the tire, or at least materially contact it, and may be somewhat thicker than otherwise. However, for the sake of uniformity and efficient design it is usually relatively thin in any case.

Referring particularly to Figs. 1, 2 and 3 of the drawing, the balance weight 1 is made up of several portions 2, 3, etc., notched therebetween with grooves 4 whereby one or more of the portions may be broken off if desired to obtain the weight required. An attachment portion 5, preferably in the form of a resilient spring clip, straddles the outer edge of the tire retaining flange 6 and is secured to the weight 1 by a screw 7. As shown the portion of the weight 1 receiving the attachment portion 5 is slightly recessed as at 10 providing the complete unit with a smooth external contour.

In assembling the balancing unit on the flange 6 the attachment portion 5 is first placed over the flange 6 and then the weight 1 is forced into position between the flange 6 and the outer portion 9 of the attachment portion 5. When the weight is in position the screw 7 passing through the outer portion 9, is screwed into the weight 1 to positively retain the same and the attachment portion 5 against relative movement. This type of balance weight is particularly adapted for installation upon vertically disposed tire retaining flanges of the type shown and enables the weight to be closely positioned to the outer side of the flange under the rolled edge without increasing standard inside wheel clearance.

Referring particularly to Figs. 4 and 5 an attachment portion 15 is straddled over the outer tire flange 6. A balance weight 16 is provided with a recess 17 for receiving the turned up end 18 of the attachment portion 15. In the assembling operation of this embodiment of the invention the attachment portion 15 is first moved into position and then the weight 16 is forced upwardly until the turned up end 18 engages with the recess 17 thereby maintaining the weight 16 against displacement. However, if desired the weight 16 may be placed in position first.

Referring particularly to Fig. 6 the attachment portion 20 may be of resilient or non-resilient material and is shaped to conform substantially to the contour of the flange 6. A weight 21 has a recess 22 provided with a horizontal shoulder 23. The outer side of the attachment portion 20 is deflected inwardly to form a horizontal hook 24 for abutting against the shoulder 23. In the assembling operation the weight 21 is first disposed in position adjacent the flange 6. The innermost portion of the recess 22 is disposed in the body 21 so that the attachment portion 20 may be pivoted thereabout as shown by dotted lines and thus moved into clamping engagement with the flange 6. It will thus be seen that the weight 21 is positively maintained against downward movement.

Referring particularly to Fig. 7 the attachment portion 25 is provided with a configuration enabling it to substantially encompass the free sides of the weight 26. The weight 26 is provided with a groove 27 receiving the attachment portion 25. The groove 27 positively prevents relative lateral movement between the attachment portion 25 and the weight 26.

With reference to the construction shown in Figs. 6 and 7 it is desirable that the upper edge of the weights 21 and 26 respectively, in normal position engage, or be as close as possible for commercial production, to the downturned end 28 of the flange 6. With the clearance therebetween reduced to a minimum the possibility of play is reduced to a minimum and a more substantial connection is assured.

Referring particularly to Fig. 8 the balancing unit preferably comprises a substantially non-resilient attachment portion 30 having a thin lip portion 31 substantially conforming to the contour of the rim flange 32. The attachment portion 30 also has a relatively thickened portion 33 which is threaded for receiving a cap screw 34. The balancing weight 35 comprises a separable unit of a length dependent on the weight required and is adapted to be clamped against the flange 32 by the set screw 34. In this modification it is preferred that the attachment portion 30 be a steel forging and the weight 35 be of suitable bar stock material.

It will be evident from the foregoing specification that while the cooperation between the tire and attachment portion is desirable it is not an essential feature of the invention and that it is within the contemplation of the invention that the attachment portion be maintained against movement relative to the tire flange without the assistance of the tire wall.

Having thus described my invention what I claim and desire to secure by Letters Patent is:

1. A balance weight for vehicle wheels equipped with pneumatic tires mounted on a rim having a supporting flange against which the tire is urged by internal pressure, comprising a thin attachment portion of sufficient length and width as to overlap a substantial area of that portion of the rim flange against which the tire is normally urged when inserted between the rim flange and the tire, said attachment portion substantially conforming to that portion of the contour of said rim flange against which the same is urged and adapted to be held in position upon the flange solely by tire pressure and being otherwise loosely fitted on the rim, and a weighted body portion connected to said attachment portion and positionable thereby along the sides of said rim and tire.

2. In combination with a vehicle wheel having a pneumatic tire mounted upon a rim with a supporting flange against which the tire is urged by internal pressure, a balance weight selectively positionable along said flange having an attachment portion inserted between said flange and tire of sufficient width and length as to overlay a substantial area of that portion of the rim flange against which the tire is normally urged as to enable said attachment portion to be sufficiently held in position solely by tire pressure, said attachment portion being otherwise loosely fitted on said rim, and a weighted body connected to said attachment portion and positioned thereby along the sides of said tire and rim.

JAMES W. HUME.